(No Model.)
G. K. KELSEA.
BICYCLE HANDLE BAR.
No. 535,989. Patented Mar. 19, 1895.
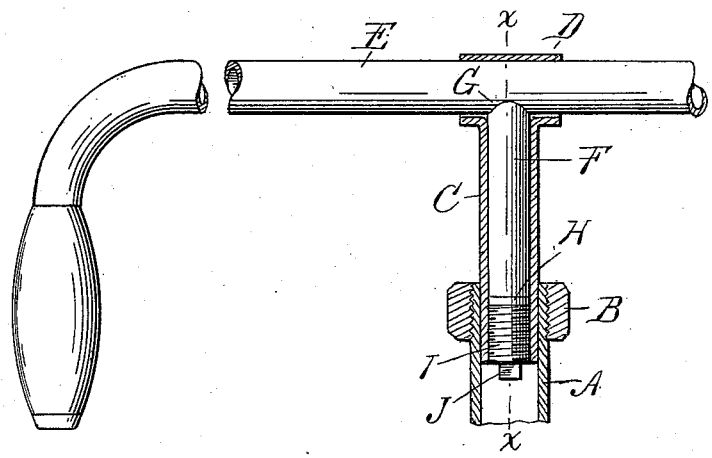
*Fig. 1*
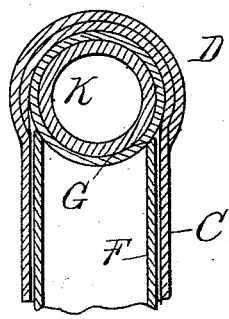
*Fig. 2*
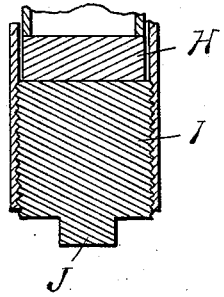
Witnesses:
P. M. Hylburg
O. F. Barthel
Inventor:
George K. Kelsea,
By Thos. Sprague & Son
Attys.

UNITED STATES PATENT OFFICE.

GEORGE K. KELSEA, OF DETROIT, MICHIGAN, ASSIGNOR OF THREE-FOURTHS TO JAMES J. NOLAN AND FRANK T. CAUGHEY, OF SAME PLACE.

BICYCLE HANDLE-BAR.

SPECIFICATION forming part of Letters Patent No. 535,989, dated March 19, 1895.

Application filed July 27, 1894. Serial No. 518,730. (No model.)

*To all whom it may concern:*

Be it known that I, GEORGE K. KELSEA, a citizen of the United States, residing at Detroit, in the county of Wayne and State of Michigan, have invented certain new and useful Improvements in Bicycle Handle-Bars, of which the following is a specification, reference being had therein to the accompanying drawings.

The invention consists in the peculiar construction of a clamping device for a handle bar, permitting its radial adjustment, so that the handle bar may be turned at any desired angle to its support, all as more fully hereinafter described.

In the drawings, Figure 1 is a vertical, central section through the front standard of a bicycle showing my improvement applied thereto. Fig. 2 is a cross section thereof on line x x.

A is the front standard of a bicycle having the upper screw threaded portion thereof split and tapered and provided with a clamping ring B.

C is the tubular handle stem formed with the transverse circular bearing D at the top in which the handle bar E engages, fitting loosely therein, so as to admit of a rotary and longitudinal adjustment of the handle bar in the bearing. This bearing is lengthened to extend slightly on both sides of the stem, as plainly shown in Fig. 1.

F is a tube having a semicircular bearing G at the top of a diameter to fit within the stem C and having its bearing G resting against the under side of the handle bar opposite the top of the transverse bearing D of the stem.

H is a washer at the lower end of the tube F and I is a screw plug engaging a screw-threaded bearing in the lower end of the stem C and provided with a suitably squared head J, by means of which it may be turned in or out of the stem.

The parts being thus constructed it is evident that by turning in the plug I it will move the tube F and clamp the handle bar between that tube and the transverse bearing D of the stem, holding it firmly in its adjusted position. When adjusted to the desired angle to the stem, the stem may be then inserted into the standard A and clamped in position by the ring B. To readjust the ring B is loosened, the stem detached and the plug again loosened, the handle turned the desired angle at which point it may be secured as described and the stem reinserted for use.

I prefer to reinforce the handle bar at the point the clamp is applied by means of an inner ring or tube K. I may insert a solid plug at that point so that the clamping effect of the tube F will not damage the tube of which the handle bar is made. This construction gives me a positive clamp for holding the handle bar in its adjusted position and at the same time does not add materially to the expense of manufacture or the weight of the bicycle on which it is used.

What I claim as my invention is—

1. The combination with the handle bar of a stem having a transverse bar at the top in which said handle loosely engages, a clamping member in said stem, a curved bearing at the top engaging with the under side of the handle bar and a screw plug in the end of the stem for actuating said clamping member, substantially as described.

2. The combination with a bicycle handle bar having a central reinforcement, of the tubular stem C having the transverse tubular bearing D at the top with which the handle bar loosely engages, the tube F slidingly secured in the stem and having the curved bearing G at its top engaging the handle bar, the washer H and the screw plug I having the squared head J, the parts arranged as and for the purpose described.

In testimony whereof I affix my signature in presence of two witnesses.

GEORGE K. KELSEA.

Witnesses:
M. B. O'DOGHERTY,
O. F. BARTHEL.